(12) United States Patent
Quesada et al.

(10) Patent No.: US 11,715,450 B2
(45) Date of Patent: Aug. 1, 2023

(54) ACOUSTIC PANEL CORE CELL WITH FUNNEL SHAPED SEPTUM

(71) Applicant: Rohr, Inc., Chula Vista, CA (US)

(72) Inventors: Marc W. Quesada, Yucaipa, CA (US); Jose S. Alonso-Miralles, Chula Vista, CA (US); Michael Scamardo, Rancho Cucamonga, CA (US); Kathryn Mireles, San Diego, CA (US); Richard S. Alloway, San Diego, CA (US); Luby Weaver, Redlands, CA (US); Yves Klett, Gerlingen (DE)

(73) Assignee: Rohr, Inc., Chula Vista, CA (US)

( * ) Notice: Subject to any disclaimer, the term of this patent is extended or adjusted under 35 U.S.C. 154(b) by 223 days.

(21) Appl. No.: 17/130,424

(22) Filed: Dec. 22, 2020

(65) Prior Publication Data
US 2022/0199064 A1    Jun. 23, 2022

(51) Int. Cl.
*G10K 11/172*    (2006.01)
*G10K 11/168*    (2006.01)
*G10K 11/175*    (2006.01)

(52) U.S. Cl.
CPC .......... *G10K 11/172* (2013.01); *G10K 11/168* (2013.01); *G10K 11/175* (2013.01)

(58) Field of Classification Search
CPC .. G10K 11/172; G10K 11/168; G10K 11/175; F02C 7/045; F02C 7/24
See application file for complete search history.

(56) References Cited

U.S. PATENT DOCUMENTS

| | | | | |
|---|---|---|---|---|
| 3,831,710 A | * | 8/1974 | Wirt | B32B 15/08 428/116 |
| 3,887,031 A | * | 6/1975 | Wirt | G10K 11/172 181/292 |
| 4,035,535 A | * | 7/1977 | Taylor | G10K 11/172 428/116 |
| 5,760,349 A | * | 6/1998 | Borchers | B64G 1/002 181/293 |
| 6,274,216 B1 | | 8/2001 | Gonidec | |
| 6,536,556 B2 | | 3/2003 | Porte | |
| 7,051,489 B1 | | 5/2006 | Swiszcz | |

(Continued)

FOREIGN PATENT DOCUMENTS

| | | |
|---|---|---|
| CN | 104175616 B | 6/2016 |
| CN | 104723616 B | 7/2016 |

(Continued)

OTHER PUBLICATIONS

EP search report for EP21216451.1 dated May 11, 2022.

*Primary Examiner* — Jeremy A Luks
(74) *Attorney, Agent, or Firm* — Getz Balich LLC

(57) ABSTRACT

An acoustic panel is provided that includes a perforated first skin, a second skin and a core. The core is connected to the perforated first skin and the second skin. The core includes a plurality of chambers and a plurality of septums respectively arranged with the chambers. The chambers include a first chamber that extends vertically between the perforated first skin and the second skin. The septums include a first septum that extends laterally across the first chamber. The first septum includes a first septum orifice. The first septum tapers laterally inward towards the first septum orifice as the first septum extends vertically towards the second skin.

12 Claims, 9 Drawing Sheets

(56) References Cited

U.S. PATENT DOCUMENTS

| | | | |
|---|---|---|---|
| 7,819,224 B2 * | 10/2010 | Borchers | F02C 7/24 |
| | | | 181/292 |
| 8,302,733 B2 | 11/2012 | Peiffer | |
| 8,689,936 B2 * | 4/2014 | Richter | G10K 11/172 |
| | | | 52/145 |
| 8,727,072 B2 | 5/2014 | Ayle | |
| 8,955,643 B2 | 2/2015 | Liu | |
| 9,403,338 B2 | 8/2016 | Tuczek | |
| 9,469,985 B1 | 10/2016 | Ichihashi | |
| 9,592,918 B2 | 3/2017 | Yu | |
| 9,643,392 B2 * | 5/2017 | Butler | B32B 27/06 |
| 9,708,930 B2 | 7/2017 | Koroly | |
| 9,732,677 B1 | 8/2017 | Chien | |
| 9,764,818 B2 | 9/2017 | Nampy | |
| 10,332,501 B2 | 6/2019 | Lin | |
| 11,434,826 B2 * | 9/2022 | Riou | G10K 11/172 |
| 2007/0034447 A1 | 2/2007 | Proscia | |
| 2008/0020176 A1 | 1/2008 | Ayle | |
| 2008/0020188 A1 | 1/2008 | Gale | |
| 2014/0349082 A1 | 11/2014 | Tien | |
| 2015/0041247 A1 | 2/2015 | Ichihashi | |
| 2015/0367953 A1 | 12/2015 | Yu | |
| 2017/0028667 A1 | 2/2017 | Fach | |
| 2017/0182723 A1 | 6/2017 | Calisch | |
| 2017/0225764 A1 | 8/2017 | Nampy | |
| 2017/0301334 A1 | 10/2017 | Nampy | |
| 2018/0016981 A1 | 1/2018 | Herrera | |
| 2018/0142621 A1 | 5/2018 | Biset | |
| 2018/0142622 A1 | 5/2018 | Biset | |
| 2019/0063318 A1 | 2/2019 | Roach | |
| 2019/0270504 A1 | 9/2019 | Cedar | |
| 2020/0003230 A1 | 1/2020 | Alonso-Miralles | |
| 2020/0063691 A1 | 2/2020 | Kruckenberg | |
| 2020/0309028 A1 | 10/2020 | Murugappan | |

FOREIGN PATENT DOCUMENTS

| | | | | |
|---|---|---|---|---|
| FR | 3093374 A1 * | 9/2020 | | B29D 24/005 |
| FR | 3117658 A1 * | 6/2022 | | |
| GB | 2550926 B | 7/2018 | | |
| JP | 5151535 | 2/2013 | | |
| WO | 2014200499 | 12/2014 | | |

* cited by examiner

ACOUSTIC PANEL CORE CELL WITH FUNNEL SHAPED SEPTUM

BACKGROUND

1. Technical Field

This disclosure relates generally to acoustic panels such as, but not limited to, an acoustic panel for attenuating sound generated by an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a non-perforated back skin. The honeycomb core includes a plurality of resonating chambers.

The acoustic panel may be configured as a single degree of freedom (SDOF) acoustic panel, where each resonating chamber extends through the honeycomb core unobstructed between the face skin and the back skin. Alternatively, the acoustic panel may be configured as a double-degree of freedom (DDOF) acoustic panel, where each resonating chamber is divided by a septum into two fluidly coupled sub-chambers. While various types and configurations of double-degree of freedom acoustic panels are known in the art, there is still room in the art form improvement. There is a need in the art therefore for an improved double-degree of freedom acoustic panel.

SUMMARY OF THE DISCLOSURE

According to an aspect of the present disclosure, an acoustic panel is provided that includes a perforated first skin, a second skin and a core. The core is connected to the perforated first skin and the second skin. The core includes a plurality of chambers and a plurality of septums respectively arranged with the chambers. The chambers include a first chamber that extends vertically between the perforated first skin and the second skin. The septums include a first septum that extends laterally across the first chamber. The first septum includes a first septum orifice. The first septum tapers laterally inward towards the first septum orifice as the first septum extends vertically towards the second skin.

According to another aspect of the present disclosure, another acoustic panel is provided that includes a perforated first skin, a second skin and a core. The core is connected to the perforated first skin and the second skin. The core includes a plurality of chambers and a plurality of septums. Each of the chambers is vertically between the perforated first skin and the second skin. The chambers include a first chamber. Each of the septums is arranged with a respective one of the chambers. The septums include a first septum configured with a funnel-shaped body that divides the first chamber into a first cavity and a second cavity.

According to still another aspect of the present disclosure, another acoustic panel is provided that includes a perforated first skin, a second skin and a core. The core is connected to the perforated first skin and the second skin. The core includes a plurality of chambers and a plurality of septums. Each of the chambers is vertically between the perforated first skin and the second skin. The chambers include a first chamber. Each of the septums is arranged with a respective one of the chambers. The septums include a first septum. The first septum includes a tubular body that tapers to an orifice at a distal end of the first septum. The tubular body is configured with a polygonal cross-sectional geometry.

The first septum may include a first septum orifice that fluidly couples the first cavity with the second cavity. The funnel-shaped body may extend laterally across the first chamber. The funnel-shaped body may taper laterally inwards to the first septum orifice as the funnel-shaped body extends vertically away from the perforated first skin.

The core may also include a first chamber body that circumscribes and forms the first chamber between the perforated first skin and the second skin. An outer peripheral edge of the funnel-shaped body may be connected to the first chamber body.

An outer peripheral edge of the funnel-shaped body may be connected to the perforated first skin.

The first septum may be configured to divide the first chamber into a first cavity and a second cavity that is fluidly coupled with the first cavity by the first septum orifice.

The first cavity may extend vertically from the perforated first skin to the first septum. The second cavity may extend vertically from the first septum to the second skin.

The first septum may be configured with a funnel-shaped body.

The first septum may project vertically out from the perforated first skin towards the first septum orifice.

The first septum orifice may have a polygonal cross-sectional geometry.

The first septum orifice may have a circular cross-sectional geometry.

The first septum may have a polygonal cross-sectional geometry.

The first septum may include a plurality of septum walls including a first septum wall and a second septum wall. The first septum wall may meet the second septum wall at a corner. The first septum wall and the second septum wall each extend to and partially form the first septum orifice.

The core may also include a first chamber body that circumscribes and forms the first chamber between the perforated first skin and the second skin. The first septum may be connected to the first chamber body.

The first chamber body may have a polygonal cross-sectional geometry.

The chambers may also include a second chamber. The core may also include a second chamber body that circumscribes and forms the second chamber between the perforated first skin and the second skin. The first chamber body and the second chamber body may share a common wall.

The chambers may also include a second chamber. The core may also include a second chamber body that circumscribes and forms the second chamber between the perforated first skin and the second skin. A wall of the first chamber body may be laterally adjacent and parallel with a wall of the second chamber body.

The chambers may also include a second chamber. The core may also include a second chamber body that circumscribes and forms the second chamber between the perforated first skin and the second skin. A wall of the first chamber body may be laterally adjacent and angularly offset from a wall of the second chamber body.

At least the perforated first skin, the second skin and the core may form a component of an aircraft propulsion system.

The core may be formed from and/or (e.g., only or at least) include a folded sheet of material.

The core may be formed from and/or (e.g., only or at least) include a cut and folded sheet of material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
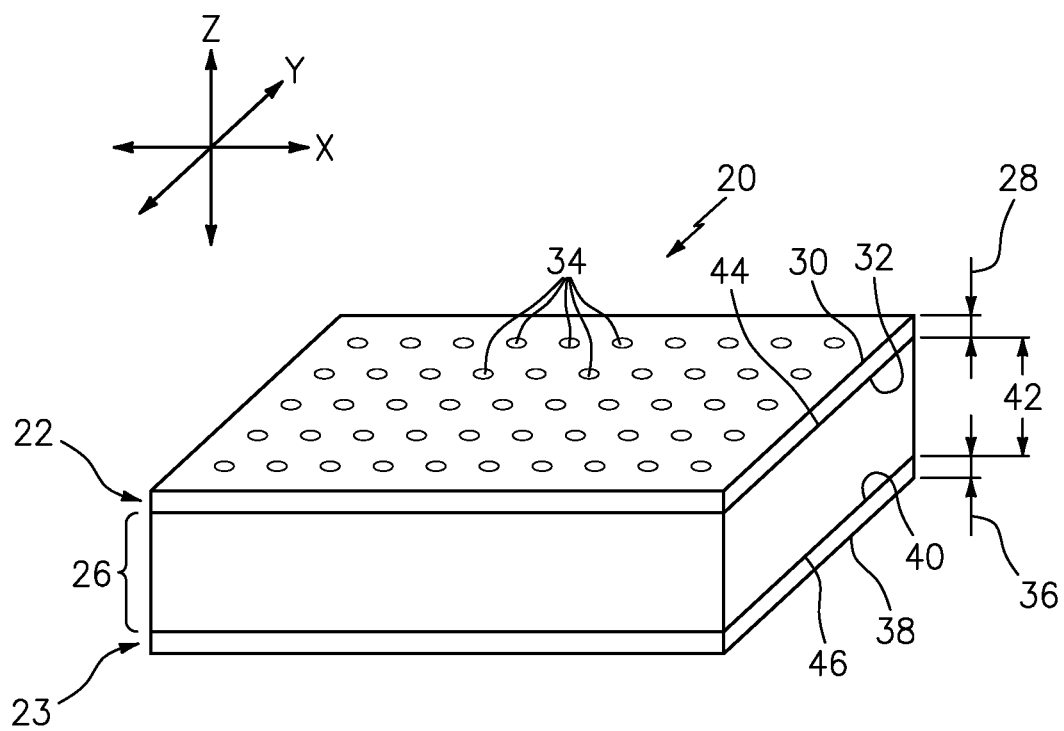
FIG. 1 is a partial perspective schematic illustration of a structural, acoustic panel for attenuating sound.

FIG. 1 is a partial perspective schematic illustration of a structural, acoustic panel 20 for attenuating sound; i.e., noise. This acoustic panel 20 may be configured to attenuate sound generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or otherwise included as part of an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related sound other than sound generated by the propulsion system. The acoustic panel 20 of the present disclosure, of course, may alternatively be configured for non-aircraft applications.

The acoustic panel 20 extends laterally in a first lateral direction (e.g., an x-axis direction) along an x-axis. The acoustic panel 20 extends laterally in a second lateral direction (e.g., a y-axis direction) along a y-axis. The acoustic panel 20 extends vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 20 includes a perforated first skin 22 (e.g., a face, front and/or exterior skin with one or more through-holes), a solid, non-perforated second skin 24 (e.g., a back and/or interior skin without any through-holes) and a structural cellular core 26. Briefly, the cellular core 26 is arranged and extends vertically between the first skin 22 and the second skin 24. The cellular core 26 is also connected to the first skin 22 and/or the second skin 24. The cellular core 26, for example, may be welded, brazed, fused, adhered or otherwise bonded to the first skin 22 and/or the second skin 24. The cellular core 26 may also and/or alternatively be mechanically fastened to the first skin 22 and/or the second skin 24. Alternatively, the cellular core 26 may be formed integral with the first skin 22 and/or the second skin 24 as a monolithic body using, for example, a molding process or an additive manufacturing process. The present disclosure, of course, is not limited to any particular manufacturing methods.

The first skin 22 may be configured as a relatively thin sheet or layer of material that extends laterally within the x-y plane. This first skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. The first skin 22 has a vertical thickness 28. This first skin vertical thickness 28 extends vertically between opposing side surfaces 30 and 32 of the first skin 22. The first skin 22 includes a plurality of perforations 34; e.g., apertures such as through-holes. Each of these first skin perforations 34 extends generally vertically through the first skin 22 between the first skin side surfaces 30 and 32.

The second skin 24 may be configured as a relatively thin sheet or layer of (e.g., continuous and uninterrupted) material that extends laterally within the x-y plane. This second skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. The second skin material may be the same as or different than the first skin material. The second skin 24 has a vertical thickness 36. This second skin vertical thickness 36 extends vertically between opposing side surfaces 38 and 40 of the second skin 24. The second skin vertical thickness 36 may be substantially equal to or different (e.g., greater or less) than the first skin vertical thickness 28.

The cellular core 26 extends laterally within the x-y plane. The cellular core 26 has a vertical thickness 42. This core vertical thickness 42 extends vertically between opposing sides 44 and 46 of the cellular core 26, which core sides 44 and 46 are respectively abutted against the interior first skin side surface 32 and the interior second skin side surface 40. The core vertical thickness 42 may be substantially greater than the first skin vertical thickness 28 and/or the second skin vertical thickness 36. The core vertical thickness 42, for example, may be at least ten to forty times (10-40×), or more, greater than the vertical thickness 28, 36; however, the acoustic panel 20 of the present disclosure is not limited to such an exemplary embodiment.

Figure 2:
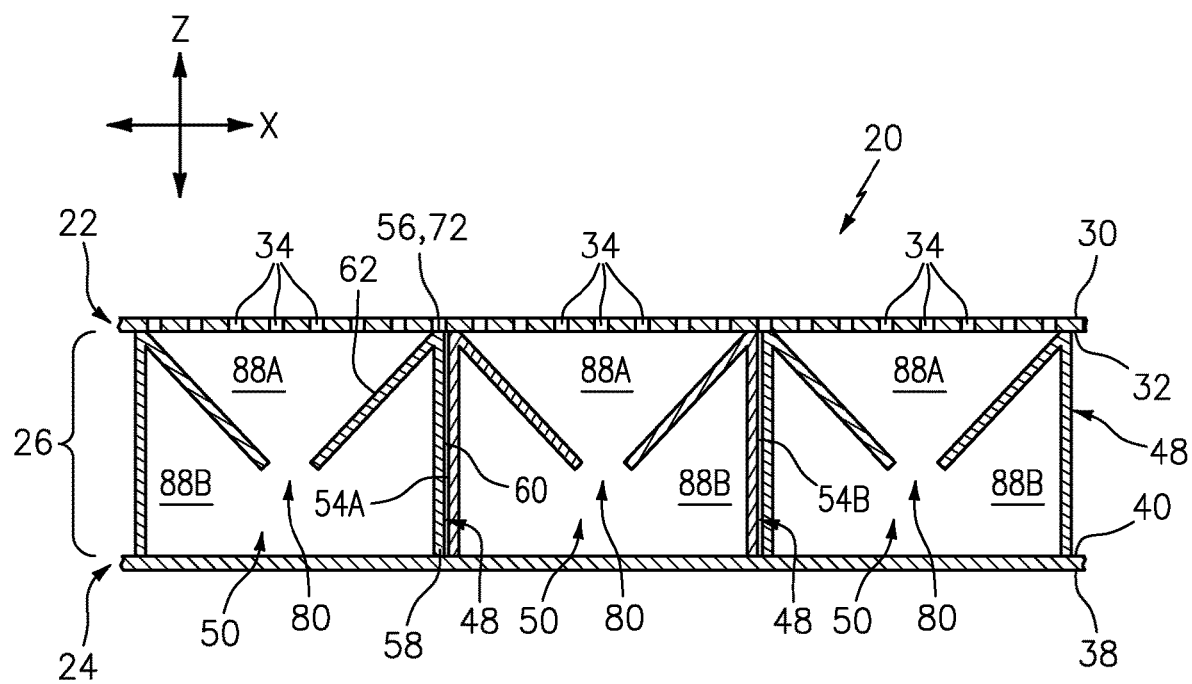
FIG. 2 is a partial side sectional illustration of the acoustic panel in an x-z plane.
Figure 3:
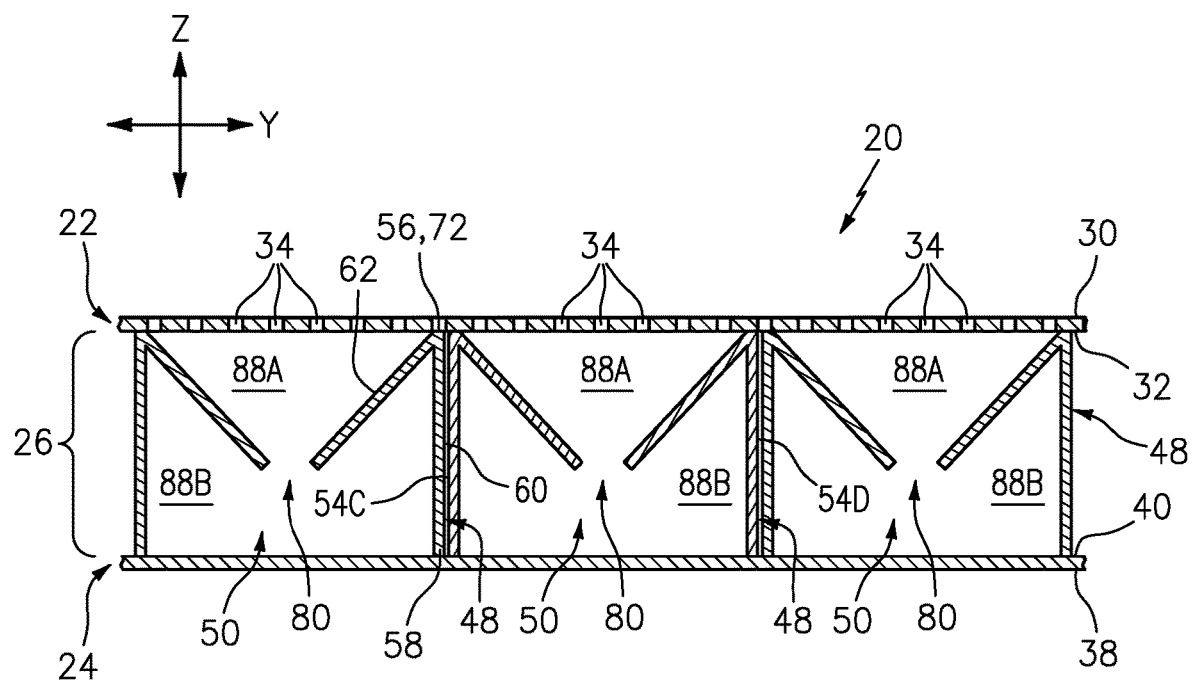
FIG. 3 is a partial side sectional illustration of the acoustic panel in a y-z plane.
Figure 4:
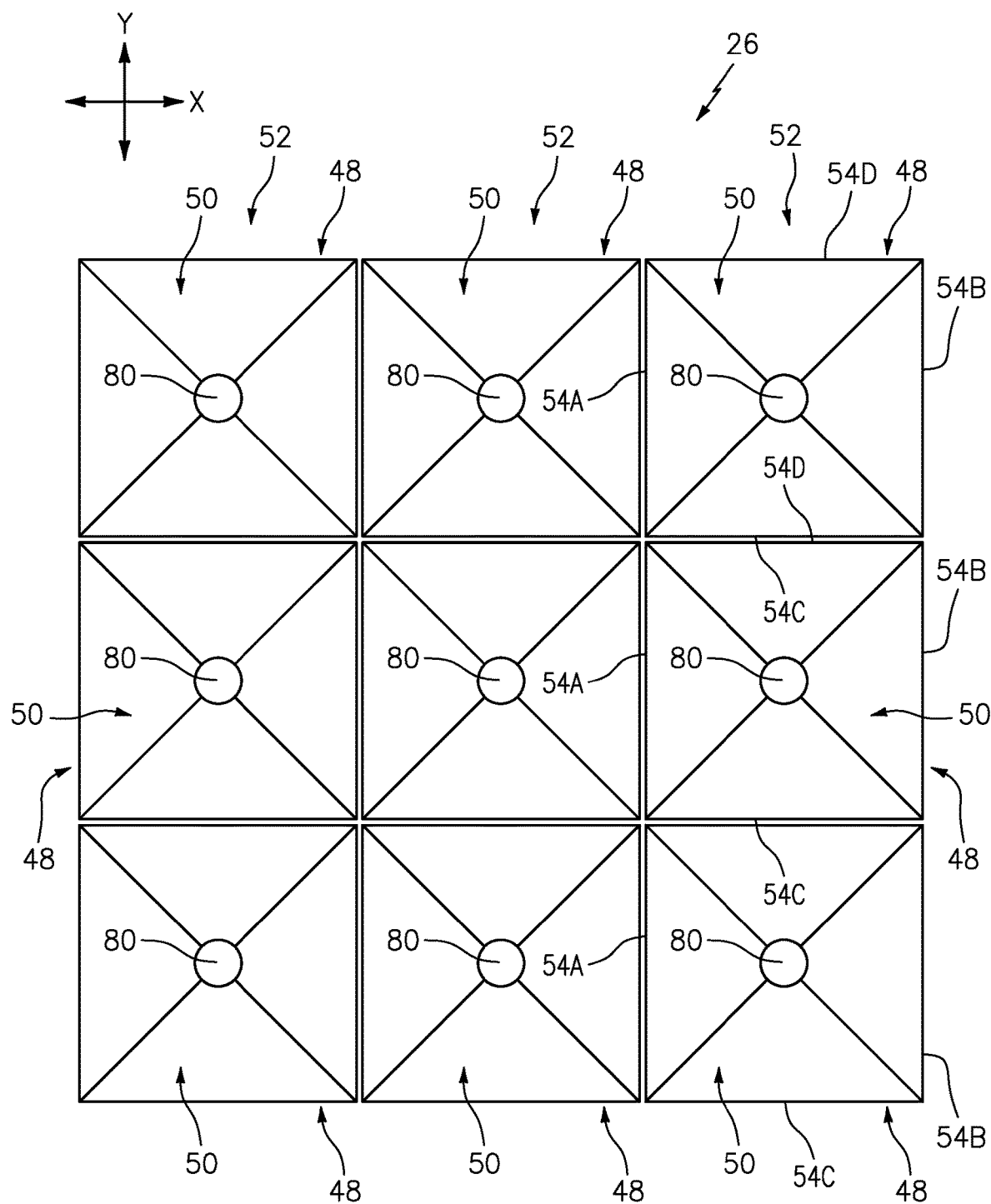
FIG. 4 is an illustration of a portion of a cellular core for the acoustic panel in an x-y plane.

Referring to FIGS. 2-4, the cellular core 26 includes a plurality of core cells 48 configured to respectively form a plurality of internal (e.g., resonance) chambers 50 vertically between the first skin 22 and the second skin 24. Each of the core cells 48 of FIGS. 2-4 may be (e.g., uniquely) associated with a respective (e.g., single) one of the internal chambers 50. Similarly, each of the internal chambers 50 of FIGS. 2-4 may be (e.g., uniquely) associated with a respective (e.g., single) one of the core cells 48.

Referring to FIG. 4, the core cells 48 and the internal chambers 50 are arranged in a pattern such as, but not limited to, a regular grid or matrix. This pattern of the core elements 48 and 50 includes one or more arrays 52 (e.g., columns) of the core elements 48 and 50. Each core element array 52 may be arranged parallel with one or more or all of the other core element arrays 52 within the core element pattern. Each core element array 52 of FIG. 4, for example, extends laterally in the second lateral direction along the y-axis (or, alternatively in any other common direction). Each core element array 52 includes one or more of the core cells 48 and the one or more associated internal chambers 50.

Figure 5:
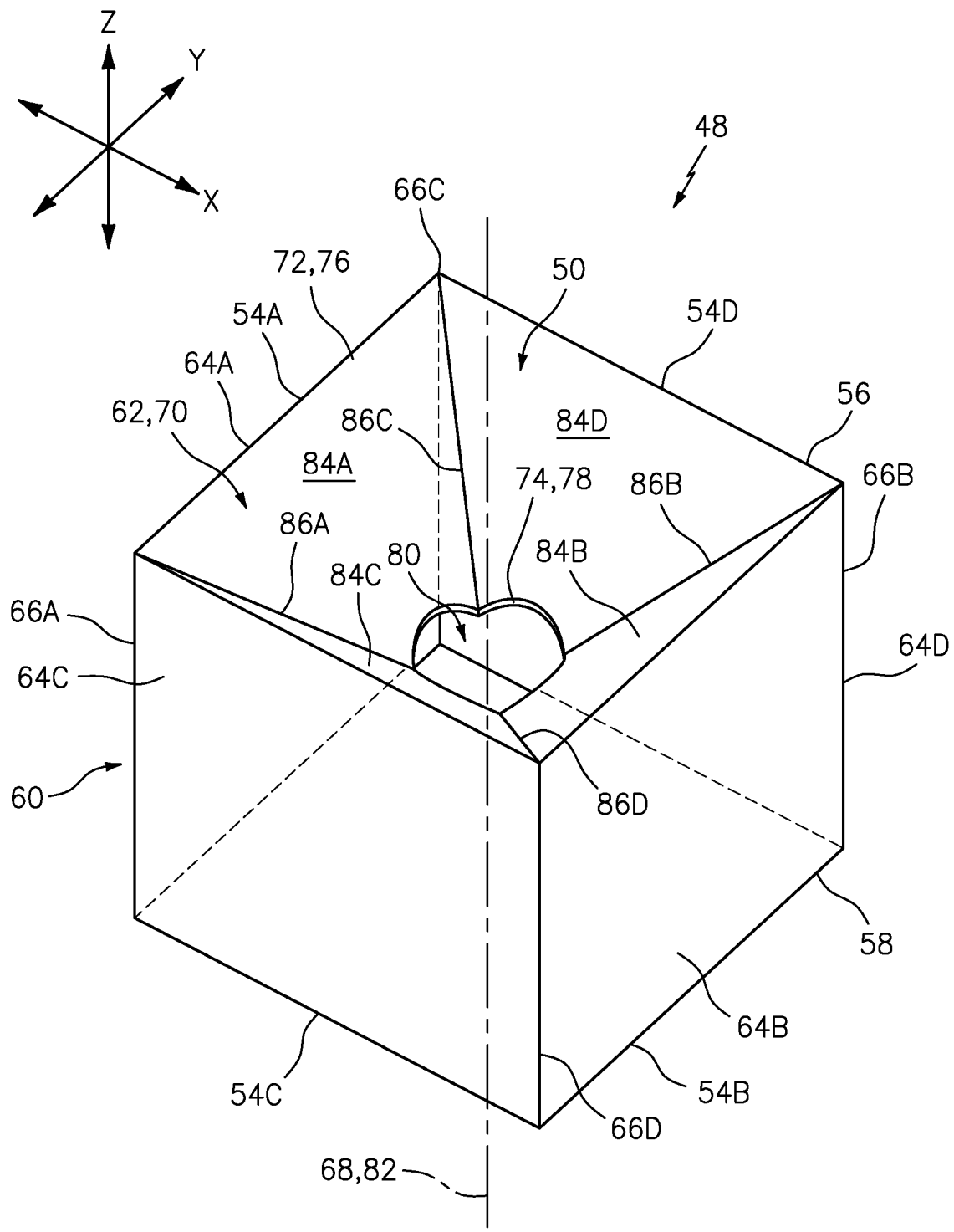
FIG. 5 is a perspective illustration of a core cell for the cellular core.

Referring to FIG. 5, each core cell 48 extends laterally in the first lateral direction along the x-axis between opposing core cell sides 54A and 54B. Each core cell 48 extends laterally in the second lateral direction along the y-axis between opposing core cell sides 54C and 54D, where the core cell sides are generally referred to as "54". Each core cell 48 extends vertically in the vertical direction between opposing core cell ends 56 and 58.

Figure 6:
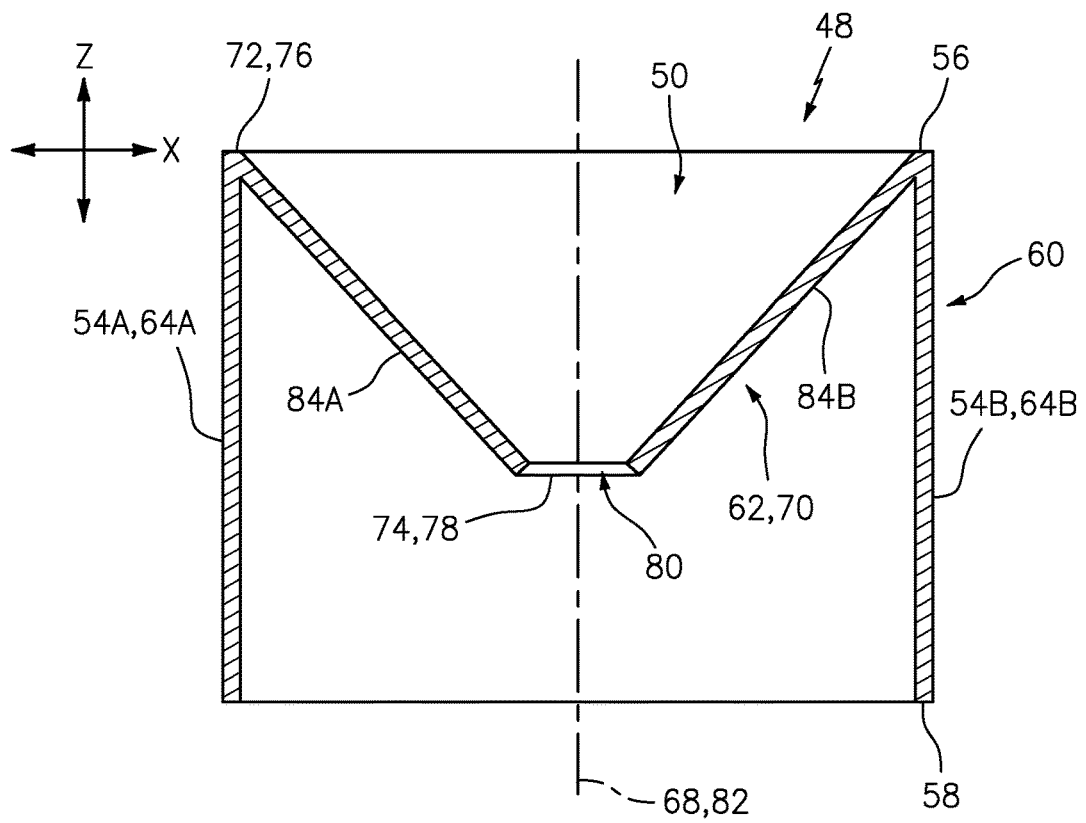
FIG. 6 is a side sectional illustration of the core cell in the x-z plane.
Figure 7:
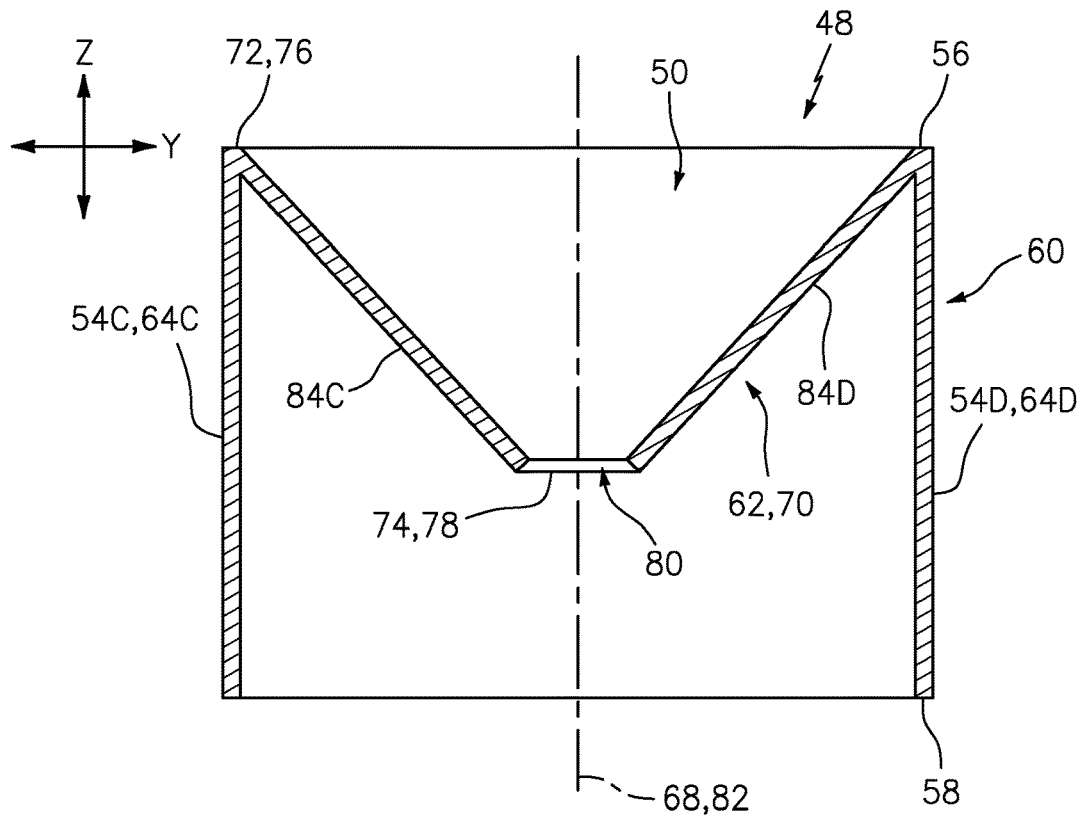
FIG. 7 is a side sectional illustration of the core cell in the y-z plane.

Each core cell 48 of FIGS. 5-7 includes a (e.g., tubular) chamber body 60 and a septum 62. The chamber body 60 has an internal bore that extends vertically (e.g., completely) through the core cell 48 (and the cellular core 26) between the opposing core cell ends 56 and 58. This internal bore forms a respective one of the internal chambers 50 within the core cell 48.

The chamber body 60 of FIGS. 5-7 includes a plurality of chamber walls 64A-D (generally referred to as "64"); e.g., sidewalls, segments, planer panels, etc. Each of the chamber walls 64 is arranged at (e.g., on, adjacent or proximate) as respective one of the core cell sides 54. Each of the chamber walls 64 extends vertically between and to the opposing core cell ends 56 and 58. Each chamber wall 64 extends laterally (e.g., in the first or second lateral direction) between and to a laterally neighboring pair of the chamber walls 64; e.g., the wall 64A extends between and to the walls 64C and 64D. Each chamber wall 64 is also connected to its laterally neighboring pair of the chamber walls 64; e.g., the wall 64A is connected to the walls 64C and 64D. Each chamber wall 64 of FIG. 5, for example, meets each laterally neighboring chamber wall 64 at a respective corner 66A-D (generally referred to as "66"); e.g., a ninety degree corner, or alternatively an acute or obtuse corner. With such an arrangement, the chamber walls 64 may provide the chamber body 60 with a polygonal (e.g., square, rectangular, etc.) cross-sectional geometry when viewed, for example, in a plane perpendicular to a longitudinal centerline 68 of the core cell 48; e.g., the plane of FIG. 4.

The septum 62 of FIGS. 5-8 is configured with a tubular funnel-shaped body 70.

Figure 8:
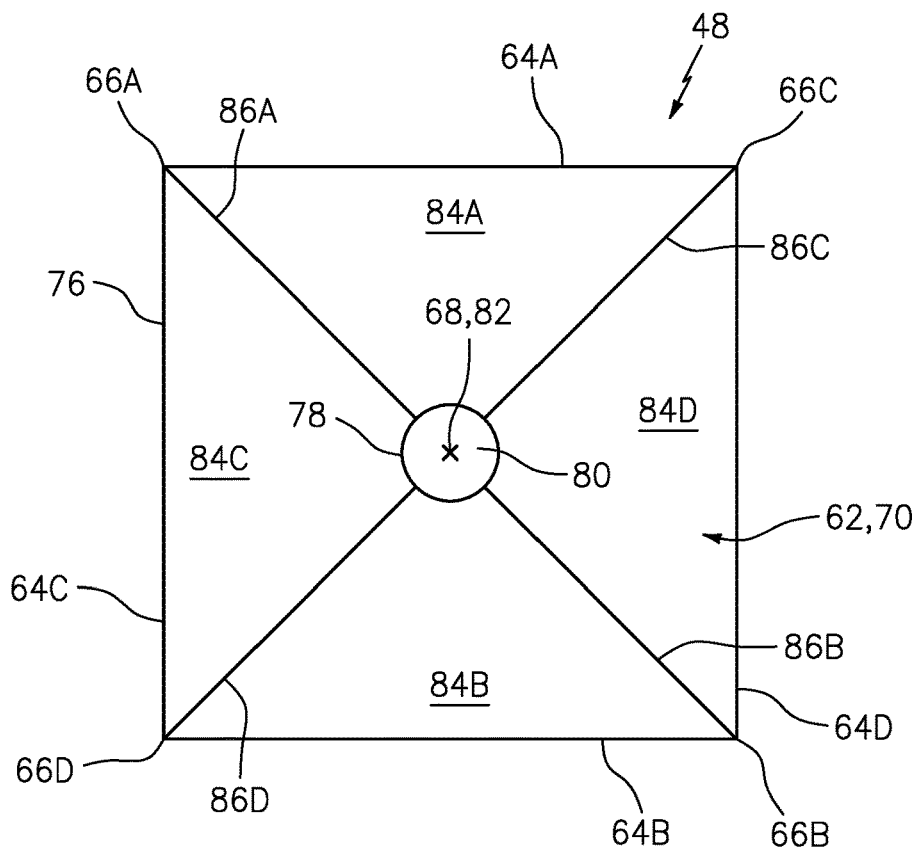
FIG. 8 is an end view illustration of the core cell with a septum orifice having a circular geometry.

The funnel-shaped body 70 of FIGS. 6 and 7, for example, extends vertically/longitudinally along the longitudinal centerline 68 from a first end 72 of the septum 62 to a second end 74 of the septum 62. An outer peripheral edge 76 of the septum 62 and its funnel-shaped body 70 may be located at (e.g., on, adjacent or proximate) the septum first end 72. An inner peripheral edge 78 of the septum 62 and its funnel-shaped body 70 may be located at (e.g., on, adjacent or proximate) the septum second end 74. Referring to FIGS. 6-8, the septum inner peripheral edge 78 forms a septum orifice 80 through the septum 62 and its funnel-shaped body 70 at the septum second end 74. The septum orifice 80 extends vertically (e.g., completely) through the septum 62 and its funnel-shaped body 70. The septum orifice 80 may be centrally located within the septum 62 and, more generally, the respective core cell 48. A centerline 82 of the septum orifice 80 of FIGS. 6 and 7, for example, is coaxial with the longitudinal centerline 68 of the respective core cell 48. The present disclosure, however, is not limited to such an exemplary arrangement.

Referring to FIGS. 6-8, the septum 62 and its funnel-shaped body 70 includes a plurality of septum walls 84A-D (generally referred to as "84"); e.g., sidewalls, segments, planer panels, etc. These septum walls 84 are arranged circumferentially about the centerline 68, 82. Each of the septum walls 84 extends vertically from the septum first end 72 and/or the septum outer peripheral edge 76 to the septum second end 74 and/or the septum inner peripheral edge 78. Each of the septum walls 84 also extends laterally (e.g., radially relative to the centerline 68, 82) from the septum first end 72 and/or the septum outer peripheral edge 76 to the septum second end 74 and/or the septum inner peripheral edge 78. Each of the septum walls 84 extends laterally (e.g., tangentially relative to the centerline 68, 82) between and to a laterally neighboring pair of the septum walls 84; e.g., the wall 84A extends laterally between and to the walls 84C and 84D. Each septum wall 84 of FIG. 8, for example, meets each laterally neighboring septum wall 84 at a respective corner 86A-D (generally referred to as "86"); e.g., an obtuse corner, or alternatively a ninety degree or an acute corner. Each septum wall 84 may be connected to its laterally neighboring pair of the septum walls 84; e.g., the wall 84A may be connected to the walls 84C and 84D. However, in other embodiments, there may be a slight (e.g., lateral) gap between the neighboring septum walls 84 at the respective corner 86, or the neighboring septum walls 84 may abut and/or laterally engage (e.g., contact) one another at the respective corner 86 without being connected together. With such an arrangement, the septum walls 84 may provide the septum 62 with a polygonal (e.g., square, rectangular, etc.) cross-sectional geometry when viewed, for example, in a plane perpendicular to the centerline 68, 82; e.g., the plane of FIG. 8.

Referring to FIGS. 5-7, with the foregoing arrangement of the septum walls 84, the septum 62 and its funnel-shaped body 70 taper laterally inward (e.g., radially inward towards the centerline 68, 82) as those elements 62 and 70 extend vertically away from the septum first end 72 and towards the septum second end 74/the septum orifice 80. The septum 62 and the funnel-shaped body 70 of FIGS. 5-7, for example, (e.g., continuously) taper laterally inward as those elements 62 and 70 extend from the septum outer peripheral edge 76 to the septum inner peripheral edge 78. The septum 62 and the funnel-shaped body 70 may thereby project (e.g., diagonally) to and may form the septum orifice 80.

Figure 9:
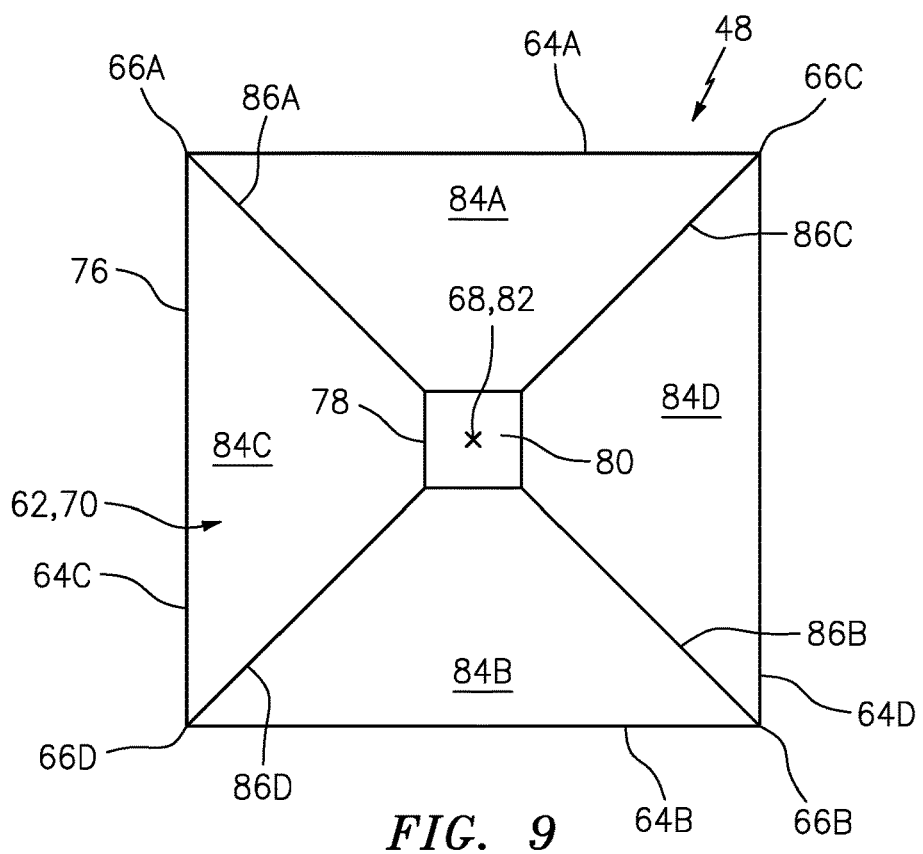
FIG. 9 is an end view illustration of the core cell with the septum orifice having a rectangular geometry.
Figure 10:
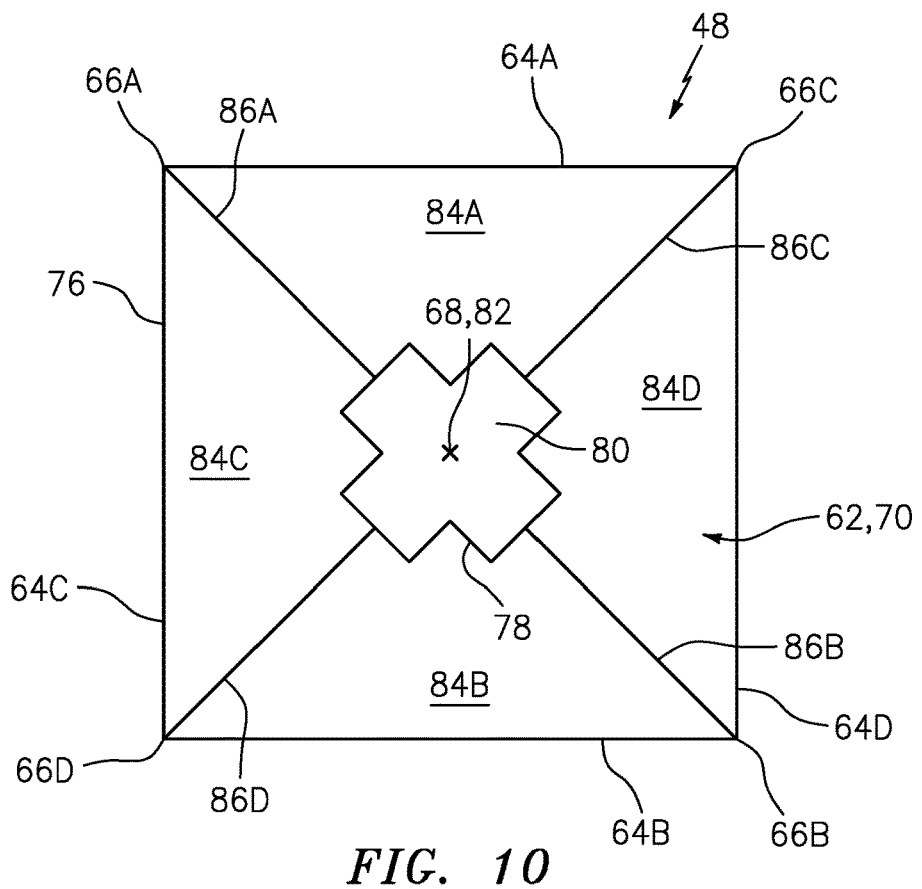
FIG. 10 is an end view illustration of the core cell with the septum orifice having a cross-shaped geometry.
Figure 11:
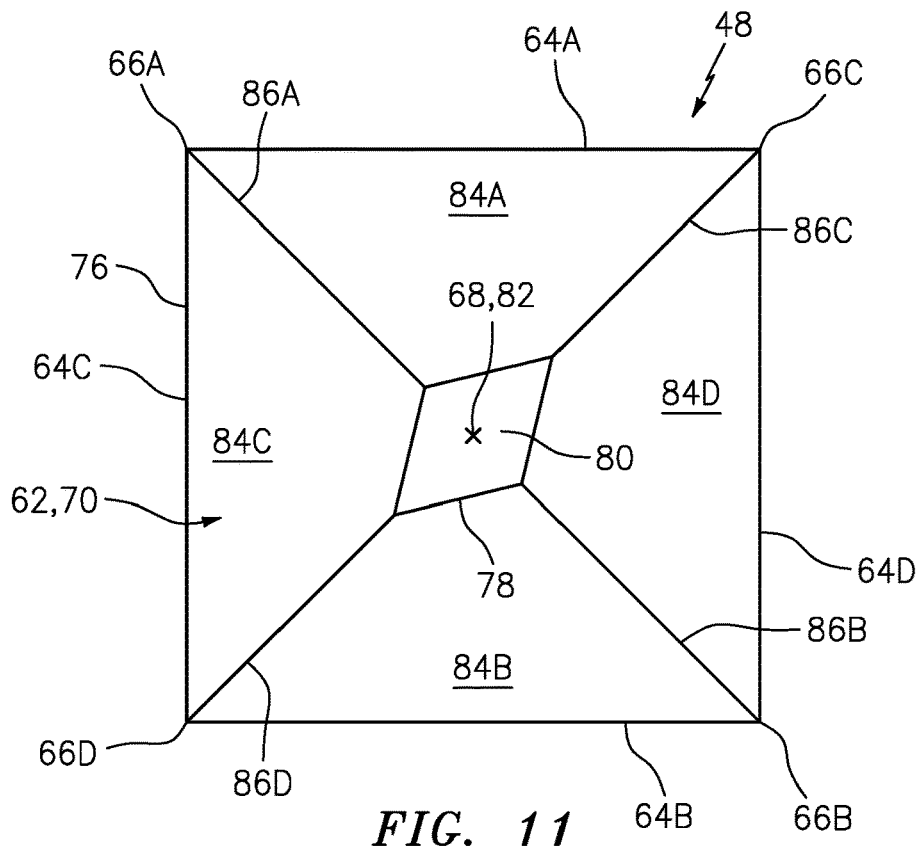
FIG. 11 is an end view illustration of the core cell with the septum orifice having a diamond-shaped geometry.

The septum orifice 80 of FIG. 8 is configured with a circular cross-sectional geometry when viewed, for example, in a plane perpendicular to the centerline 68, 82. The present disclosure, however, is not limited to such an exemplary septum orifice geometry. For example, referring to FIGS. 9-11, the septum orifice 80 may alternatively be configured with a polygonal cross-sectional geometry when viewed, for example, in a plane perpendicular to the centerline 68, 82. The septum orifice 80 of FIG. 9, for example, is configured with a rectangular (e.g., a square) cross-sectional geometry. The septum orifice 80 of FIG. 10 is configured with a cross-shaped cross-sectional geometry. The septum orifice 80 of FIG. 11 is configured with a diamond-shaped cross-sectional geometry. The present disclosure, however, is not limited to the foregoing exemplary polygonal cross-sectional geometries, nor to circular or polygonal cross-sectional geometries in general.

Referring to FIG. 8, the septum orifice 80 may be the sole orifice configured with/extending through the septum 62. The septum 62 of FIG. 8, for example, is configured as a single orifice septum.

Referring to FIGS. 5-7, the septum 62 is arranged within the bore of the chamber body 60 and, thus, within the respective internal chamber 50. The septum 62 of FIGS. 5-7, for example, is connected to an interior side of the chamber body 60. More particularly, each of the septum walls 84 (at and/or along the septum outer peripheral edge 76, and/or at and/or along the septum first end 72) is connected to a respective one of the chamber walls 64 at the core cell first end 56. The septum 62 and its funnel-shaped body 70 thereby extend laterally (e.g., completely) across respective internal chamber 50. The septum second end 74 and the septum orifice 80 are located within the respective internal chamber 50 vertically between, and vertically displaced from, the core cell ends 56 and 58.

Referring to FIG. 5, the chamber body 60 and each of its walls 64 may be formed from a solid, non-perforated sheet or panel of material. Similarly, the septum 62 and each of its walls 84 may also be formed from a solid, non-perforated sheet or panel of material. The septum material and the chamber body material may be the same material. For example, the chamber body 60 and the septum 62 may be formed together from a single sheet or panel of material. The present disclosure, however, is not limited to such an exemplary core cell construction. For example, in other embodiments, the chamber body 60 may be formed discretely from the septum 62. The core cell elements may also or alternatively be formed from different materials.

Referring to FIGS. 2 and 3, one or more or each of the core cells 48 extends vertically between and is connected (e.g., bonded or otherwise attached) to the first skin 22 and the second skin 24. The chamber body 60 at the first core cell end 56, for example, is connected to the first skin 22. The septum 62 at the septum first end 72 is also connected to the first skin 22. The septum 62 thereby projects into the respective internal chamber 50 from the chamber body 60 and/or the first skin 22. The chamber body 60 at the second core cell end 58 is connected to the second skin 24.

Each internal chamber 50 extends vertically through the respective chamber body 60 between and to the first skin 22 and the second skin 24. Each septum 62 fluidly separates/divides the respective internal chamber 50 into a plurality of cavities 88A and 88B (generally referred to as "88"); e.g., sub-chambers. The first cavity 88A extends vertically along the internal side of the respective chamber body 60 from the first skin 22 to the respective septum 62. The second cavity 88B extends vertically along the internal side of the respective chamber body 60 from the respective septum 62 to the second skin 24. The second cavity 88B is thereby fluidly coupled with the first cavity 88A (e.g., only) through/by the respective septum orifice 80 in the respective septum 62. Each internal chamber 50 and each respective first cavity 88A is also fluidly coupled with one or more of the first skin perforations 34.

Figure 12:
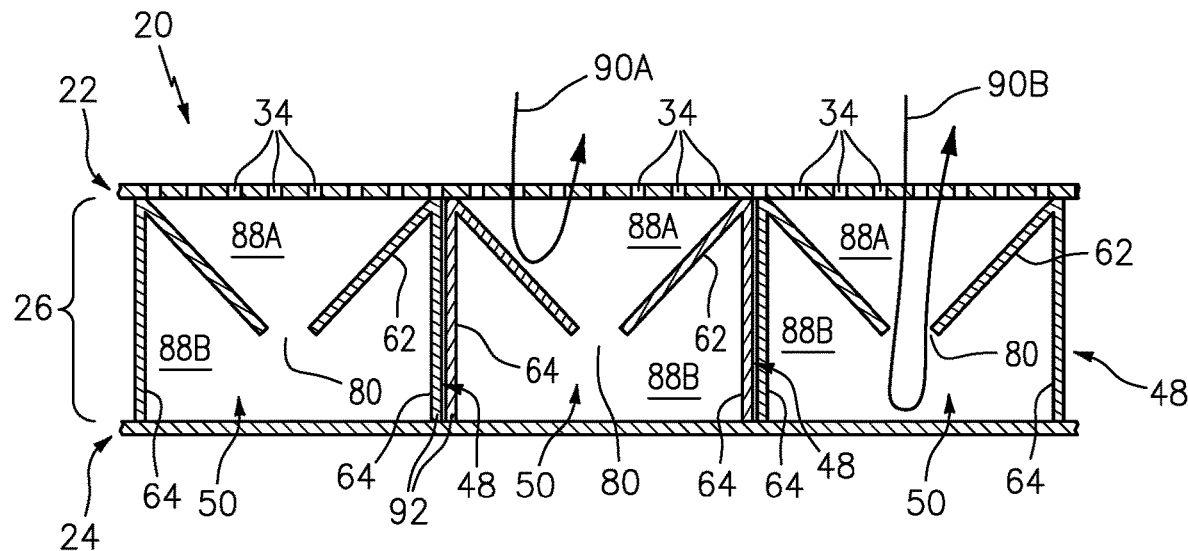
FIG. 12 is a partial side sectional illustration of the acoustic panel depicted with schematic sound wave trajectories.

Referring to FIG. 12, the acoustic panel 20 of is configured as a double-degree of freedom (DDOF) acoustic panel. Sound waves entering each internal chamber 50, for example, may follow a plurality of trajectories 90A and 90B (generally referred to as "90"), which trajectories 90 are illustrated to schematically depict which cavities 88 are involved rather than specific sound wave paths. The first trajectory 90A extends away from the respective first skin perforations 34, is reversed by the respective septum 62, and extends back to the respective first skin perforations 34. The second trajectory 90B extends away from the respective first skin perforations 34 and through the respective septum orifice 80, is reversed by the second skin 24, and extends back through the respective septum orifice 80 and to the respective first skin perforations 34. With such an arrangement, each internal chamber 50 may be operable to reverse phase of a plurality of frequencies of the sound waves using known acoustic reflection principles and subsequently direct the reverse phase sound waves out of the acoustic panel 20 through the first skin perforations 34 to destructively interfere with other incoming noise waves.

Figure 13:
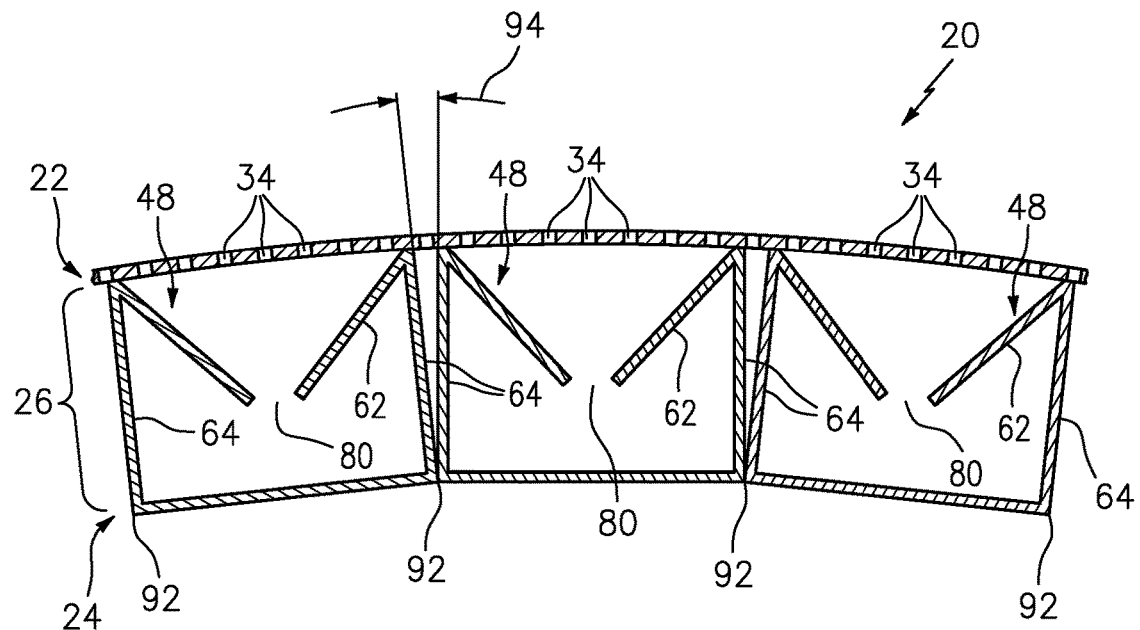
FIG. 13 is a partial side sectional illustration of the acoustic panel with a non-planar configuration.

Referring to FIG. 12, one or more or each of the chamber walls 64 of a respective core cell 48 may be arranged laterally adjacent the chamber wall 64 of another respectively laterally neighboring core cell 48. Exterior surfaces of the respective laterally neighboring chamber walls 64 may be connected together. With such an arrangement, the respective laterally neighboring chamber walls 64 may form a single common chamber wall for both adjacent core cells 48. Alternatively, the respective laterally neighboring chamber walls 64 may be replaced by a single common chamber wall. In other embodiments, the respective laterally neighboring chamber walls 64 may be located adjacent one another and/or laterally engage (e.g., abut) one another without being (e.g., directly) connected together along their exterior surfaces. For example, referring to FIG. 13, one or more edges (e.g., 92) of the respective laterally neighboring chamber walls 64 may be connected together.

In some embodiments, referring to FIG. 12, the respective laterally neighboring chamber walls 64 may be arranged parallel with one another. In other embodiments, referring to FIG. 13, the respective laterally neighboring chamber walls 64 may be angularly offset from one another by an included angle 94; e.g., an acute angle. Such an angular displacement between the respective chamber walls 64 and, thus, the core cells 48 may facilitate forming (e.g., bending) the acoustic panel 20 into a non-planar shape.

The cellular core 26 may be constructed from various material(s). The cellular core 26, for example, may be constructed from metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. One or more or all components of the cellular core 26 may be constructed from the same (e.g., identical) or a like material. The cellular core material may also be the same or similar to the first skin material and/or the second skin material. Alternatively, one or more of the components of the cellular core 26 may be constructed from a different material than one or more of the other components of the cellular core 26.

Figure 14:
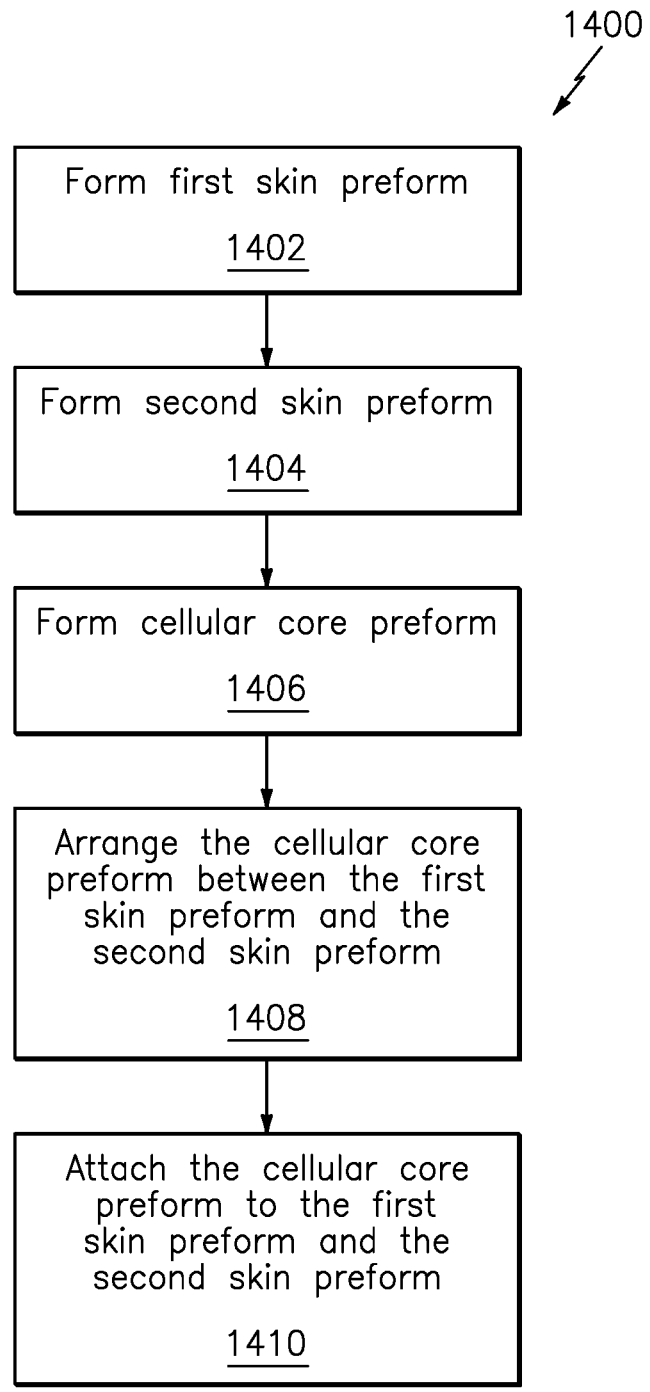
FIG. 14 is a flow diagram of a method for forming an acoustic panel.

FIG. 14 is a flow diagram of a method 1400 for forming an acoustic panel. For ease of description, this method 1400 is described below with reference to the acoustic panel 20 described above. The method 1400, however, is not limited to forming such an exemplary acoustic panel.

In step 1402, a preform of the first skin 22 is formed. A first sheet of material (e.g., prepreg material or any other sheet material), for example, may be received and cut to size. This first sheet of material may subsequently be perforated to provide the first skin preform. The perforations in the first skin preform may become the first skin perforations 34 in the first skin 22 of the acoustic panel 20.

In step 1404, a preform of the second skin 24 is formed. A second sheet of material (e.g., prepreg material or any other sheet material), for example, may be received and cut to size to provide the second skin preform. A size (e.g., length and width) of the second skin preform may be about or exactly the same as a size (e.g., length and width) of the first skin preform.

In step 1406, a preform of the cellular core 26 is formed. A third sheet of material (e.g., prepreg material or any other sheet material), for example, may be received and cut to size. A size (e.g., length and width) of this third sheet of material may be different (e.g., substantially greater) than the size of first skin preform and/or size of the second skin preform. Select portions of the third sheet of material may be removed (e.g., perforated, cutout, etc.) to form a plurality of holes through the third sheet of material. These throughholes in the third sheet of material will become the septum orifices 80 in the septums 62 of the acoustic panel 20. The third sheet of material may subsequently be manipulated (e.g., folded, cut, etc.) to form the cellular core preform. The planar third sheet of material, for example, may be folded (e.g., using origami and/or kirigami techniques) into a three-dimensional body that includes/forms one, some or all of the core cells 48 in the cellular core 26.

In step 1408, the cellular core preform is arranged between the first skin preform and the second skin preform.

In step 1410, the cellular core preform is attached (e.g., bonded) to the first skin preform and the second skin preform to provide the acoustic panel 20. Resin in the cellular core preform, for example, may be consolidated with resin in the first skin preform and resin in the second skin preform. The method 1400 of the present disclosure, however, is not limited to such an exemplary attachment technique.

In some embodiments, the first skin preform of step 1402 may be a solid, non-perforated sheet of material. In such embodiments, the first skin perforations 34 may be formed, for example, after the first skin preform is attached to the cellular core preform.

In some embodiments, the through holes in the third sheet of material may be formed following the manipulation (e.g., folding) of the third sheet of material.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
a perforated first skin;
a second skin; and
a core connected to the perforated first skin and the second skin, the core including a plurality of chambers, a first chamber body, a second chamber body and a plurality of septums respectively arranged with the plurality of chambers;
the plurality of chambers including a first chamber and a second chamber, the first chamber extending vertically between the perforated first skin and the second skin; and
the plurality of septums including a first septum that extends laterally across the first chamber, the first septum including a first septum orifice, and the first septum tapering laterally inward towards the first septum orifice as the first septum extends vertically towards the second skin;
the first chamber body circumscribing and forming the first chamber between the perforated first skin and the second skin, and the first septum connected to the first chamber body;
the second chamber body circumscribing and forming the second chamber between the perforated first skin and the second skin; and
a first wall of the first chamber body laterally adjacent and angularly offset from a second wall of the second chamber body, and an edge of the first wall abutted against an edge of the second wall.

2. The acoustic panel of claim 1, wherein the first septum is configured to divide the first chamber into a first cavity and a second cavity that is fluidly coupled with the first cavity by the first septum orifice.

3. The acoustic panel of claim 2, wherein
the first cavity extends vertically from the perforated first skin to the first septum; and
the second cavity extends vertically from the first septum to the second skin.

4. The acoustic panel of claim 1, wherein the first septum is configured with a funnel-shaped body.

5. The acoustic panel of claim 1, wherein the first septum projects vertically out from the perforated first skin towards the first septum orifice.

6. The acoustic panel of claim 1, wherein the first septum orifice has a polygonal cross-sectional geometry.

7. The acoustic panel of claim 1, wherein the first septum orifice has a circular cross-sectional geometry.

8. The acoustic panel of claim 1, wherein the first septum has a square cross-sectional geometry or a rectangular cross-sectional geometry.

9. The acoustic panel of claim 1, wherein
the first septum includes a plurality of septum walls including a first septum wall and a second septum wall;
the first septum wall meets the second septum wall at a corner; and
the first septum wall and the second septum wall each extend to and partially form the first septum orifice.

10. The acoustic panel of claim 1, wherein the first chamber body has a square cross-sectional geometry or a rectangular cross-sectional geometry.

11. The acoustic panel of claim 1, wherein at least the perforated first skin, the second skin and the core form a component of an aircraft propulsion system.

12. The acoustic panel of claim 1, wherein the core is formed from a folded sheet of material.

\* \* \* \* \*